United States Patent [19]

Kanamaru et al.

[11] Patent Number: 4,625,304
[45] Date of Patent: Nov. 25, 1986

[54] AUTOMATIC LOADING DISC PLAYER

[75] Inventors: Hitoshi Kanamaru; Tadashi Funabashi; Junji Takahashi; Kyoichi Kato, all of Saitama, Japan

[73] Assignee: Pioneer Electronic Corp., Tokyo, Japan

[21] Appl. No.: 587,775

[22] Filed: Mar. 9, 1984

[30] Foreign Application Priority Data

Mar. 11, 1983 [JP] Japan .............................. 58-35332[U]

[51] Int. Cl.⁴ .......................... G11B 1/00; G11B 17/04; G11B 25/04
[52] U.S. Cl. .................................. 369/75.2; 369/77.1
[58] Field of Search ............................. 369/75.2, 77.1

[56] References Cited

U.S. PATENT DOCUMENTS

| 2,670,210 | 2/1954 | Thompson | 369/77.1 |
| 4,403,317 | 9/1983 | Suzuki et al. | 369/75.2 |
| 4,410,971 | 10/1983 | Eisemann | 369/75.2 |
| 4,455,637 | 6/1984 | Suzuki et al. | 369/77.1 |

FOREIGN PATENT DOCUMENTS 111703  9/1978  Japan ................................. 369/77.1

Primary Examiner—Steven L. Stephan
Attorney, Agent, or Firm—Sughrue, Mion, Zinn, Macpeak & Seas

[57] ABSTRACT

An automatic loading disc player includes a turntable for rotating a disc to be played back, a disc transfer mechanism for carrying and transferring the disc into a predetermined playback position on the turntable or a position in the vicinity thereof, and a positioning mechanism for positioning the disc in a predetermined position on the disc transfer mechanism. The positioning mechanism is engageable with at least three points on an outer peripheral edge of the disc for positioning the disc and drivable in coaction with disc transferring operation of the disc transfer mechanism. The positioning mechanism is releasable from engagement with the disc while the disc is being played back. The positioning mechanism includes three positioning levers angularly movable by an endless chain for engagement with the outer peripheral edge of the disc. With this arrangement, the disc can accurately and reliably be positioned on the disc transfer mechanism regardless of the diameter of the disc.

8 Claims, 17 Drawing Figures

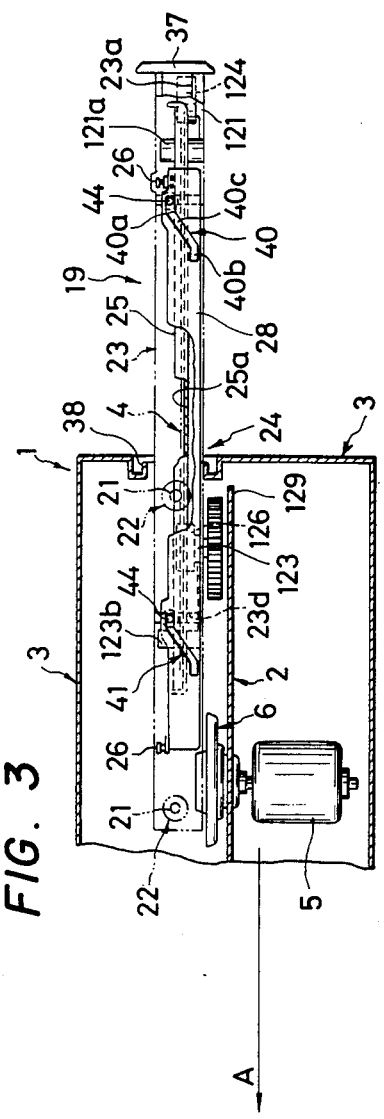
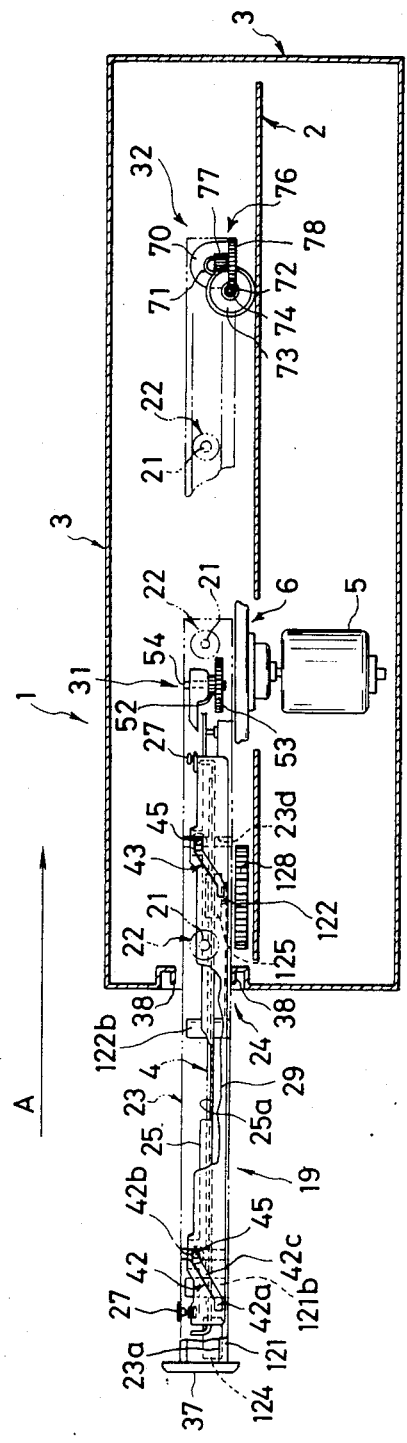
FIG. 3
FIG. 4

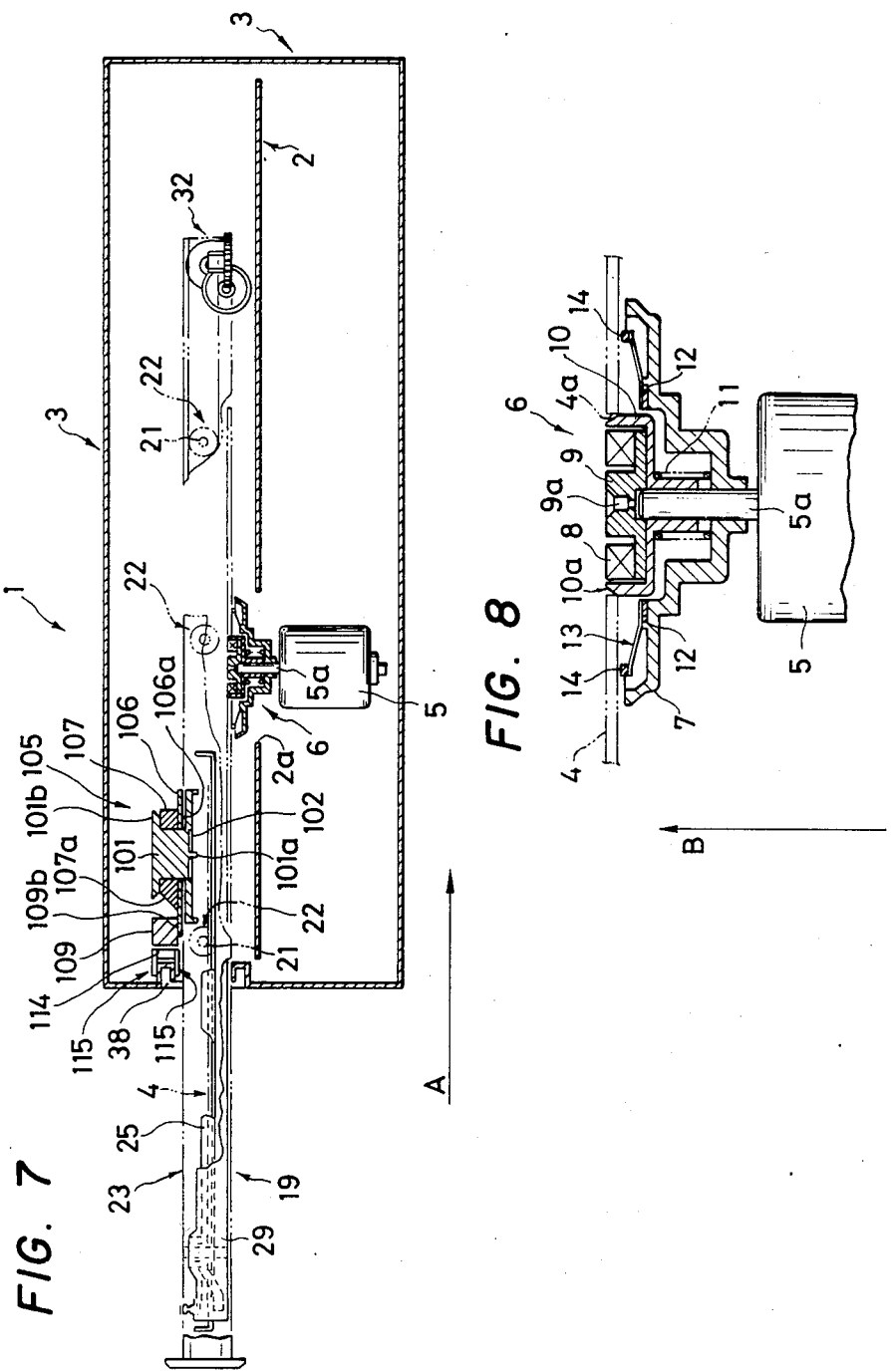

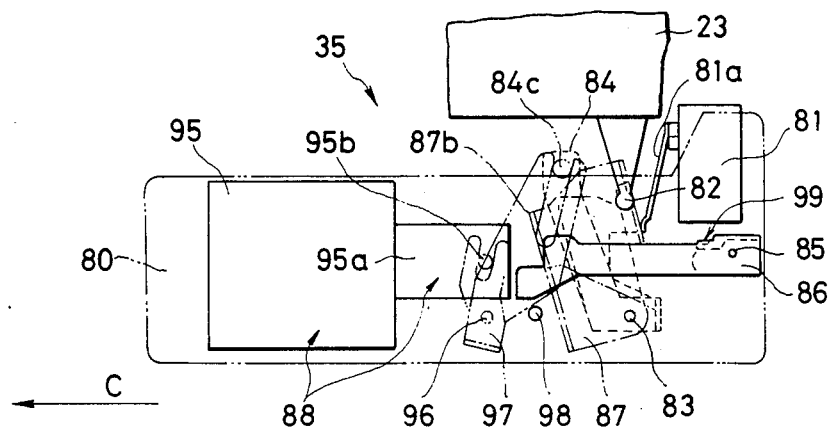
FIG. 9a
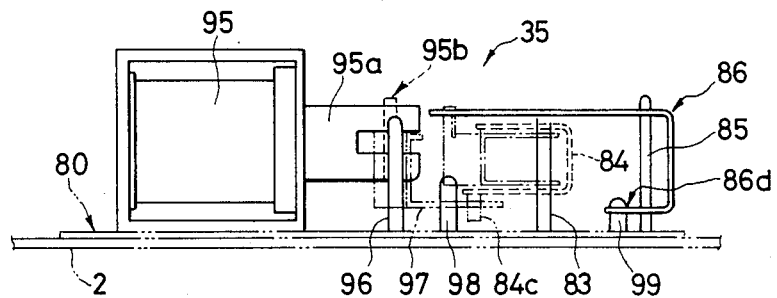
FIG. 9b
FIG. 9c
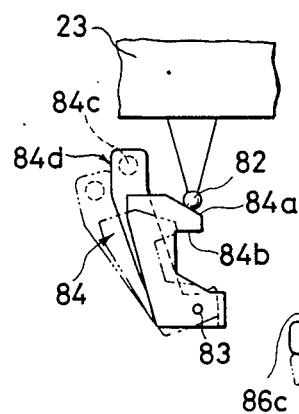
FIG. 9d
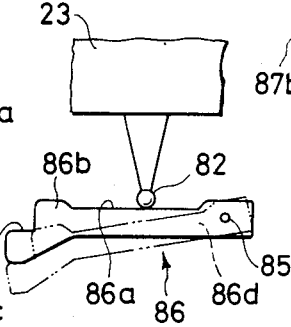
FIG. 9e
FIG. 9f
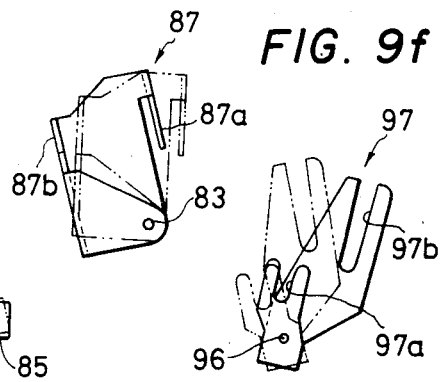

AUTOMATIC LOADING DISC PLAYER

BACKGROUND OF THE INVENTION

The present invention relates to an automatic loading disc player.

Automatic loading disc players have a playback mechanism disposed in a player housing and including a turntable and a pickup, and a disc transfer mechanism for automatically transferring a disc into a prescribed playback position on the turntable, or a position in the vicinity thereof. Such automatic loading disc players automatize various disc playback procedures such as placing a disc on the turntable and guiding the pickup onto the disc, for example.

Most such automatic loading disc players include a positioning device for positioning a disc in a prescribed location on the disc transfer mechanism. One example of such a positioning means includes a plurality of engagement members on the disc transfer mechanism which are engageable with an outer peripheral edge of the disc for positioning the disc with respect to the disc transfer mecahnism. Since the engagement members are designed for use with discs of the a single diameter only, a conventional automatic loading disc players cannot play discs of different diameters.

While a disc is being played back on the disc player, the disc must be disengaged from the engagement members on the disc transfer mechanism. Therefore, the disc player requires a special driving device for moving the engagement members into and out of engagement with a disc, and hence the player is costly to manufacture.

There has been proposed an automatic loading disc player which needs no such special driving device. In the proposed automatic loading disc player, the disc transfer mechanism has thereon a plurality of fixed engagement members engageable with an outer peripheral edge of a disc. The engagement members are formed and arranged such that there will be a predetermined gap between the engagement members and the outer peripheral edge of the disc after the positioning of the disc is completed. This arrangement is however disadvantageous in that the disc as positioned is liable to be displaced since it is freely movable in a range defined by the gap.

SUMMARY OF THE INVENTION

It is an object of the present invention to provide an automatic loading disc player having a less costly positioning device for accurately and reliably positioning a disc on a disc transfer mechanism regardless of the diameter of the disc.

Another object of the present invention is to provide an automatic loading disc player capable of loading a disc onto a turntable in a short period of time regardless of the diameter of the disc.

According to the present invention, there is provided an automatic loading disc player including a turntable for rotating a disc to be played back, a disc transfer mechanism for carrying and transferring the disc into a predetermined playback position on the turntable or a position in the vicinity thereof, and a positioning means for positioning the disc in a predetermined position on the disc transfer mechanism, the positioning means being engageable with at least three points on an outer peripheral edge of the disc for positioning the disc and being drivable in cooperation with the disc transferring operation of the disc transfer mechanism, the positioning means being releasable from engagement with the disc while the disc is being played.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 3 and 4 are lefthand and righthand side elevational views, respectively, with parts in cross section, of the internal structure of the automatic loading disc player;

FIG. 7 is a righthand side elevational view of the internal structure of the automatic loading disc player;

FIG. 8 is an enlarged cross-sectional view of a turntable;

FIGS. 9a and 9b are plan and side elevational views of a detector mechanism;

FIGS. 9c through 9f are plan views of component members of the detector mechanism;

DESCRIPTION OF THE PREFERRED EMBODIMENT

Figure 1:
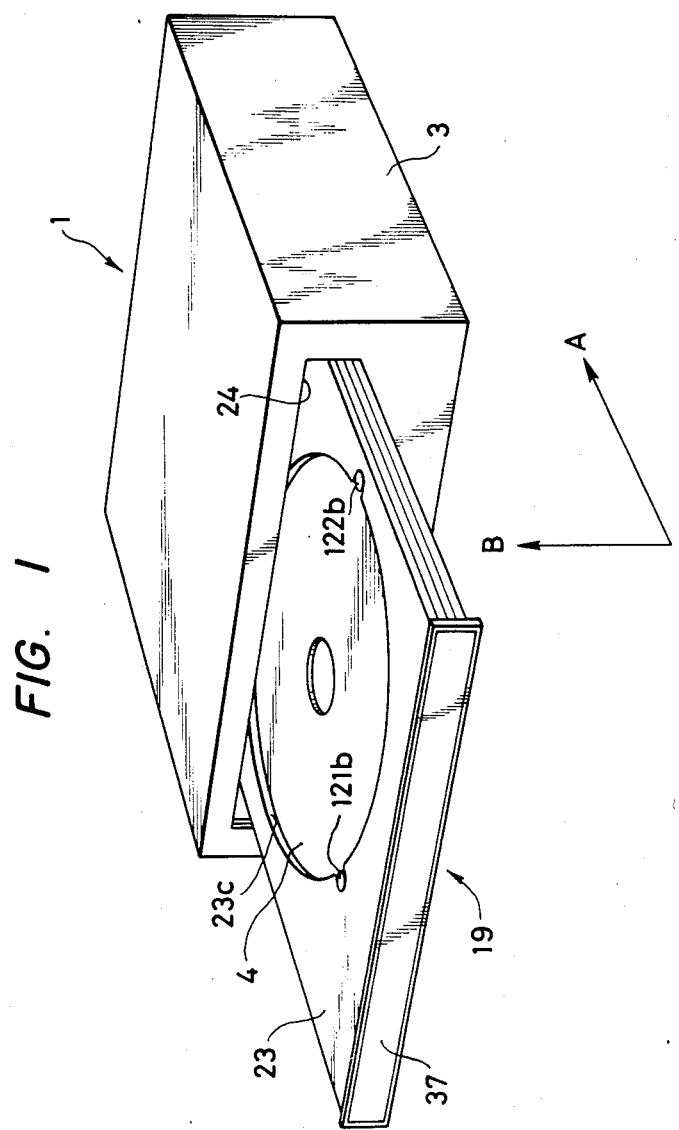
FIG. 1 is a perspective view of an automatic loading disc player according to the present invention.
Figure 2:
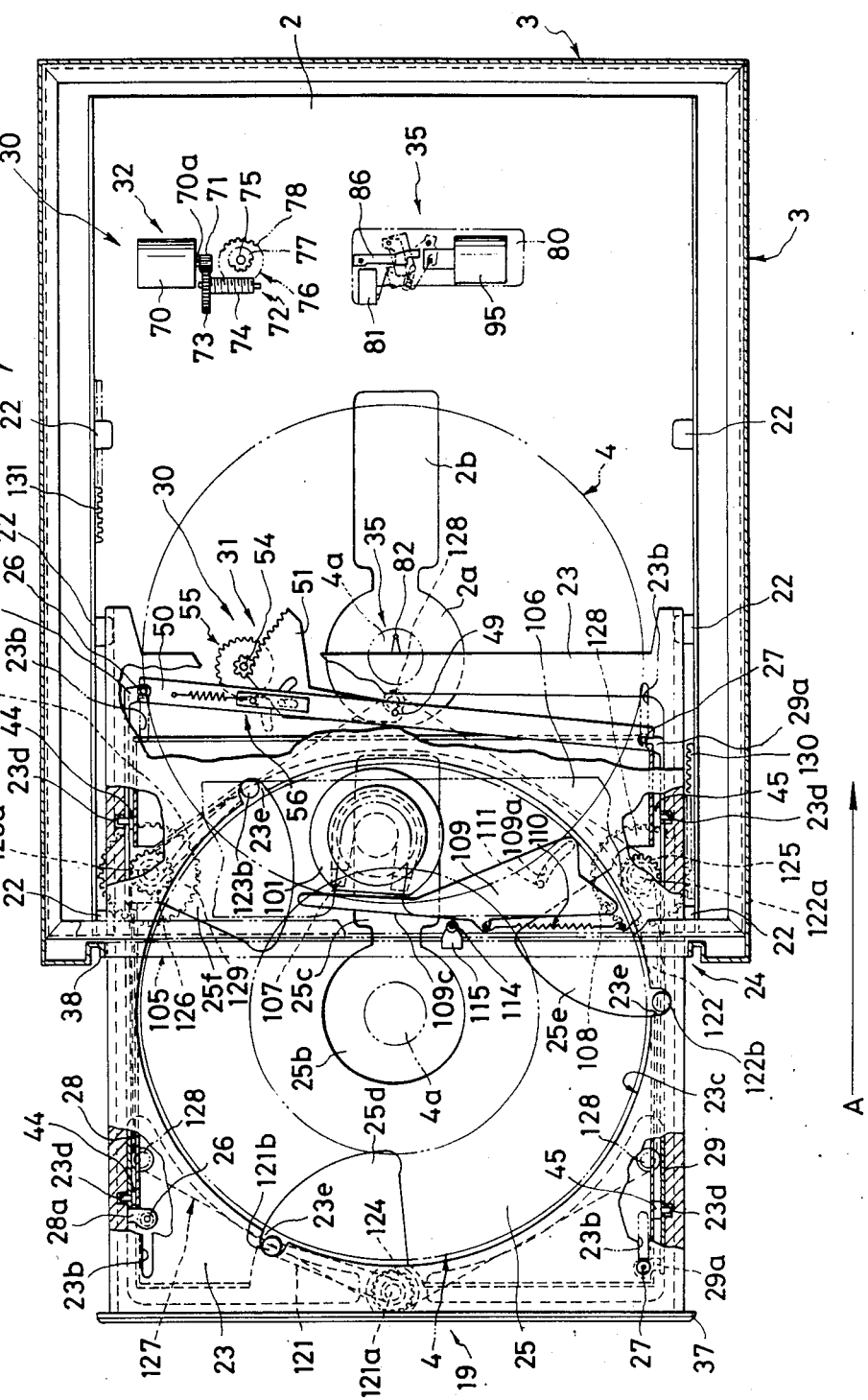
FIG. 2 is a plan view of an internal structure of the automatic loading disc player of the invention.

FIG. 1 is illustrative of an automatic loading disc player of the front disc loading type according to the present invention. The automatic loading disc player has a body 1 having a housing 3 in which a chassis 2 is mounted (FIGS. 2 and 3). Designated at 4 is a disc to be played. As shown in FIG. 2, the chassis 2 has a substantially circular hole 2a formed therein and a slot 2b communicating therewith. A turntable 6 driven by a drive motor 5 is disposed in the circular hole 2a as illustrated in FIG. 3.

As shown in FIG. 8, the turntable 6 includes a substantially dish-shaped disc holder 7 fitted over an output shaft 5a of the drive motor 5, a support 9 fitted over the end of the output shaft 5a and supporting a ring-shaped magnet 8 secured thereto, the support 9 being made of magnetic material to form a magnetic circuit, a slider 10 disposed between the disc holder 7 and the support 9 and slidably fitted over the output shaft 5a, a coil spring 11 disposed around the output shaft 5a for normally biasing the slider 10 to move upwardly in the direction of the arrow B, a cup-shaped spring 13 fixed by a fastening member 12 to the disc holder 7 in concentric relation thereto, and a plurality of rubber members 14 secured to an upper surface of an outer peripheral surface of the cup spring 13 in a pattern substantially concentric with the cup spring 13. The support 9 has a recess 9a in its center of rotation. The slider 10 has a tapered surface 10a on an outer periphery thereof adapted for engagement in a central hole 4a in the disc 4 for centrally positioning the disc 4.

The chassis 2 is vertically sandwiched between the disc and an information reading pickup device (not shown), which with the drive motor 5 and the turntable 6 in constitutes a disc playback mechanism. The slot 2b in the chassis 2 allows the information reading pickup device to have access to the disc 4 therethrough.

A disc transfer mechanism serves to transfer the disc 4 onto the turntable 6 which forms part of the disc playback mechanism. As illustrated in FIGS. 2 through 4, the disc transfer mechanism includes a tray 23 having grooves 23a in which there are disposed rollers 22 rotatably mounted on support pins 21 on inner opposite sides of the housing 3, the tray 23 being slidably movable in a rearward direction (in the direction of the arrow A) and in a forward direction. The disc transfer mechanism also includea a container 25 substantially in the form of a flat plate capable of projecting out of the housing 3 through an insertion hole 24 defined therein and cooperating with the tray 23 in constituting a disc carrier for carrying the disc 24, a pair of first and second cam members 28, 29 mounted on the tray 23 for back-and-forth movement in a certain range with their respective lugs 28a, 29a having pairs of pins 26, 27 inserted respectively in pairs of guide slots 23b defined in the tray 23, and a cam drive means 30 for driving the cam members 28, 29.

A detector is mounted on the disc carrier 19 for detecting when the disc 4 is carried on the disc carrier 19 and generating a command signal in response to such detection.

The cam drive means 30 is composed of a link assembly 31 mounted on the tray 23 and a power supply 32 secured to the chassis 2 and engageable with the link assembly 31 for supplying power to the link assembly 31. The link assembly 31 and the cam members 28, 29 jointly constitute a link mechanism.

A container drive means is constructed of the link mechanism, the power supply 32, and a detector mechanism 35 for issuing a signal to the power supply 32 in response to detection of the disc carrier 19 being accommodated in the housing 3. The container drive device includes an inhibiting device (not shown) for inhibiting movement of the container 25 until the disc carrier 19 is accommodated in the housing 3.

The tray 23 has a substantially central through hole 23c of a slightly larger inside diameter than the outside diameter of the disc 4 for receiving the disc 4 to position the same therein. The tray 23 has on its front end a knob 37. The housing 3 has an abutment 38 extending around the insertion hole 24 for providing abutting engagement with the knob 37.

Figure 5:
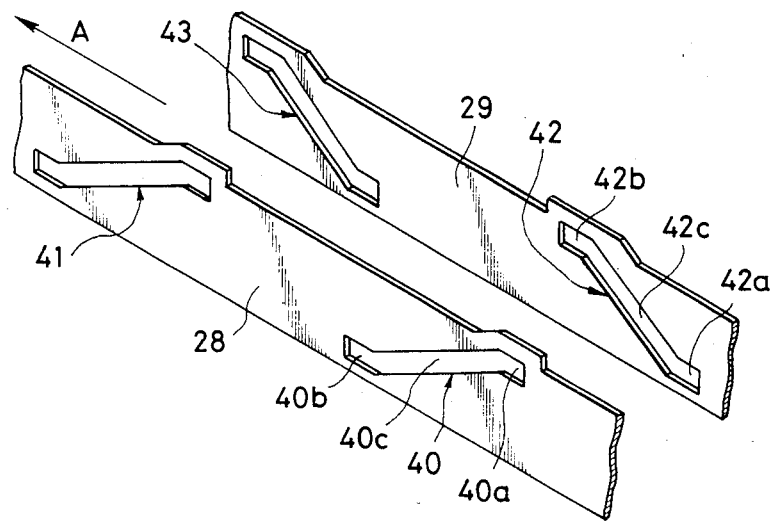
FIG. 5 is a perspective views of cam members.

As shown in FIGS. 3 through 5, the first cam member 28 has a pair of front and rear cam grooves 40, 41. The cam groove 40 includes horizontal portions 40a, 40b extending parallel to the direction of movement of the first cam member 28 and a slanted portion 40c contiguous to the horizontal portions 40a, 40b and inclined downwardly from its front to rear ends thereof. The cam groove 41 is of the same configuration as that of the cam groove 40. Likewise, the second cam member 29 has a pair of front and rear cam grooves 42, 43. The cam groove 42 includes horizontal portions 42a, 42b extending parallel to the direction of movement of the second cam member 29 and a slanted portion 42c contiguous to the horizontal portions 42a, 42b and inclined upwardly from its front to rear ends thereof. The cam groove 43 is of the same configuration as that of the cam groove 42.

Figure 6:
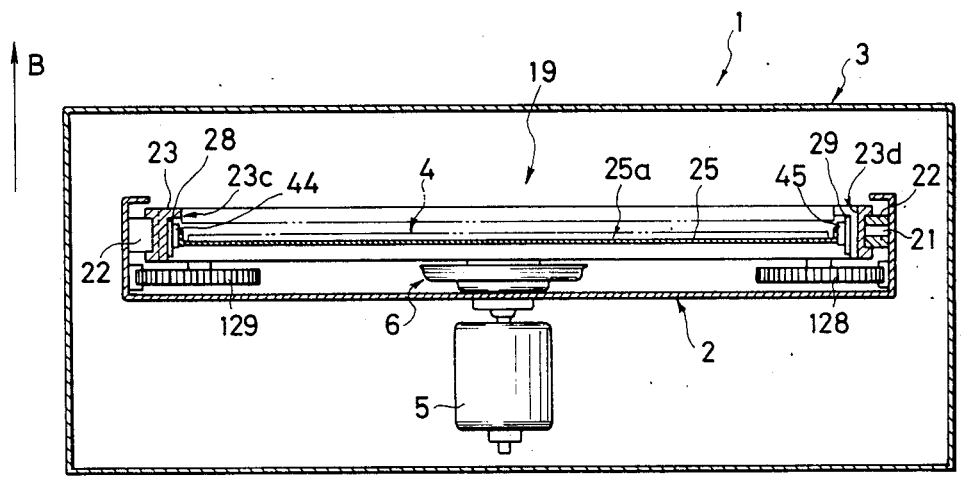
FIG. 6 is a front elevational view, partly in cross section, of the internal structure of the automatic loading disc player.

As illustrated in FIG. 6, the container 25 has a disc carrying surface 25a for carrying thereon the disc 4 fitted in the through hole 23c in the tray 23 and is fitted in the tray 23 so that the disc carrying surface 25a confronts a lower surface of the tray 23. The container 25 has pairs of engagement members 44, 45 fixed to the ends of lefthand and righthand sides as seen to the rear end (in the direction of the arrow A) of the container 25. The engagement members 44 on the ends of the lefthand side are fitted respectively in the cam grooves 40, 41 of the first cam member 28 and slidably fitted respectively in vertical grooves 23d in lefthand inner sides of the tray 23 (FIGS. 2 through 4 and 6). The engagement members 45 on the ends of the righthand side are fitted respectively in the cam grooves 42, 43 and slidably fitted respectively in vertical grooves 23d in righthand inner sides of the tray 23.

As shown in FIG. 2, the container 25 has a substantially circular opening 25b in which the turntable 6 is fitted, and a slot 25c communicating therewith. The slot 25c, like the slot 2c, allows the information reading pickup device to have access to the disc 4 therethrough while the container 25 is positioned between the information reading pickup device and the disc 4.

Figure 10:
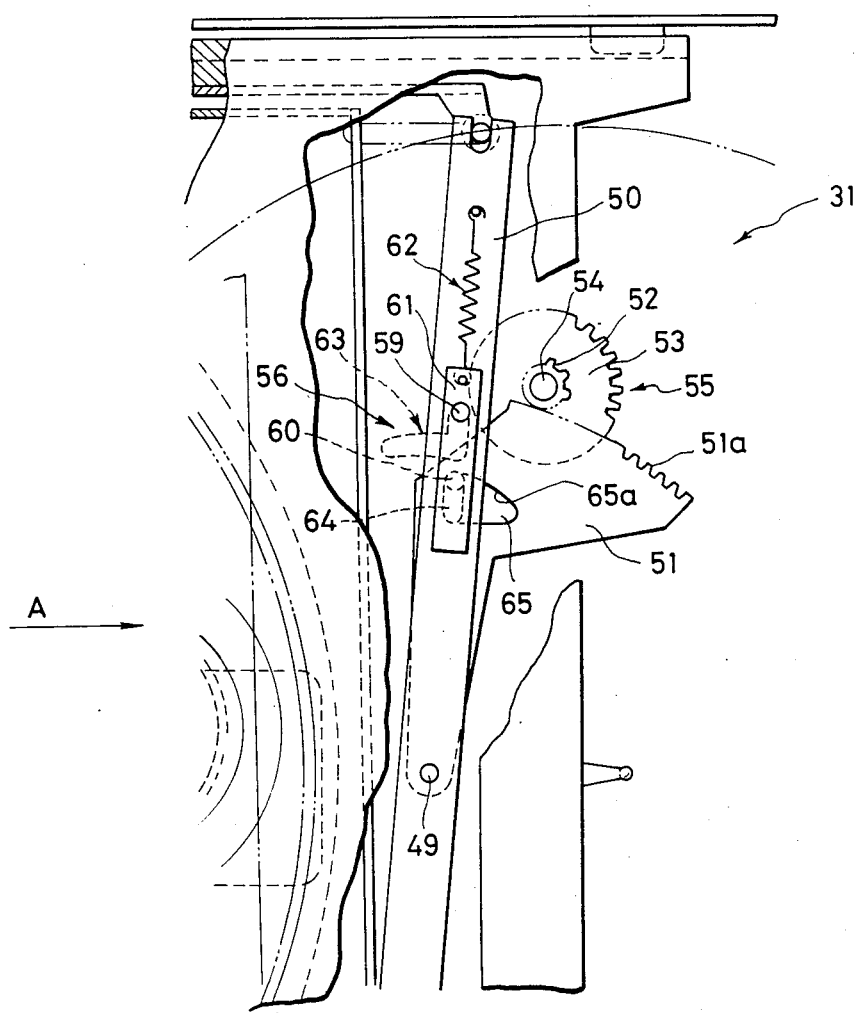
FIG. 10 is an enlarged plan view of a link assembly.

In FIGS. 2 and 10, the link assembly 31 includes an elongated member 50 pivotally supported at a substantially central portion thereof by a support pin 49 on the tray 23, a rocking member 51 having one end swingably supported by the support pin 49, a double gear 55 having a smaller gear 52 and a larger gear 53 and rotatably supported on a support pin 54 on the tray 23, and a lock mechanism 56 included in the inhibiting device for locking the link assembly 31 against operation. The elongated member 50 has its opposite ends held in engagement respectively with the pins 26, 27 on the rear ends of the cam members 28, 29. The rocking member 51 has gear teeth 51a held in mesh with the smaller gear 52 of the double gear 55.

Figure 11:
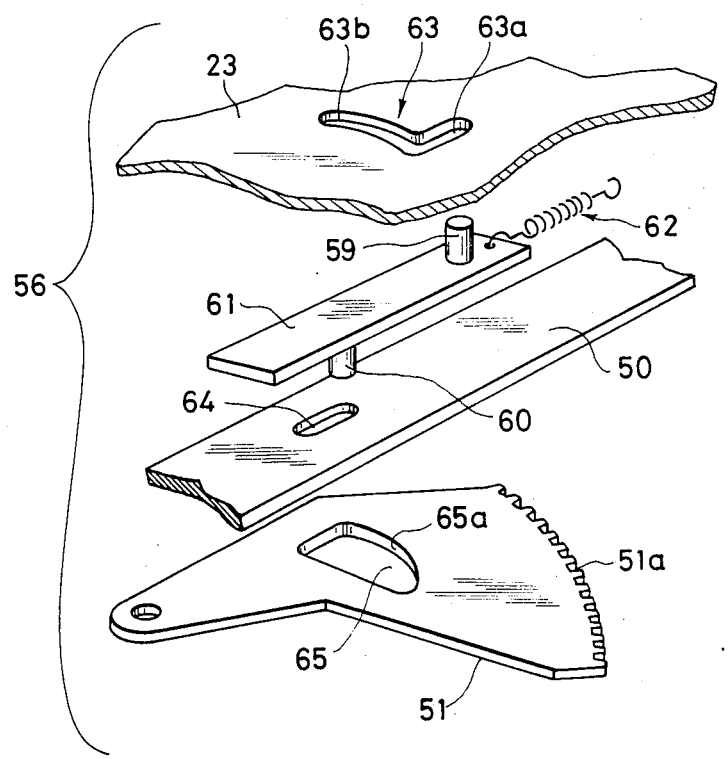
FIG. 11 is an enlarged exploded perspective view of a lock mehcanism in the link mechanism.
Figure 12:
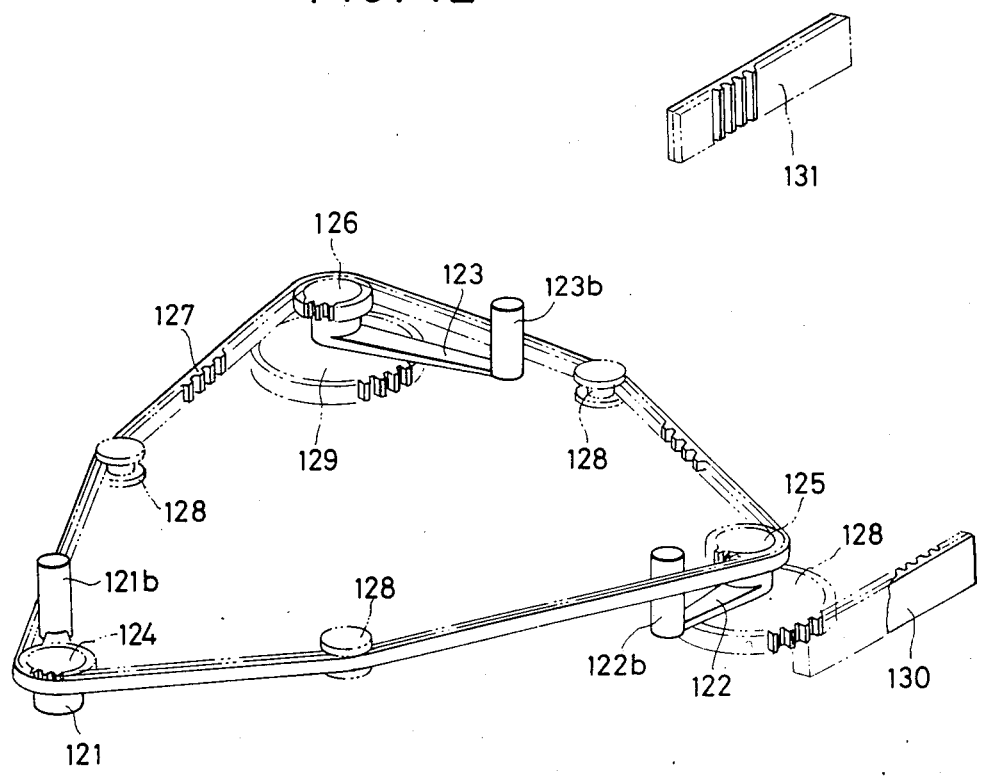
FIG. 12 is a perspective view of a positioning mechanism.

As illustrated in FIG. 11, the lock mechanism 56 is composed of a movable member 61 in the form of a flat plate having studs 59, 60 on upper and lower surfaces thereof and movable in the direction in which the elongated member 50 extends, and a coil spring 62 having one end connected to the movable member 61 and an opposite end to the elongated member 50 for normally urging the movable member 61 to move upwardly in FIG. 10. The lock mechanism 56 also includes a substantially L-shaped through hole 63 defined in the tray 23 and in which the stud 59 is disposed, a through hole 64 defined in the elongated member 50 substantially parallel thereto and in which the stud 60 is disposed, and a substantially sectorial cam hole 65 defined in the rocking member 51 and in which the stud 60 extending through the hole 64 is disposed, the cam hole 65 having a cam surface 65a against which the post 60 abuts.

The substantially L-shaped through hole 63 has a shorter-diameter portion 63a extending substantially parallel to the elongated member 50 in the condition in which the link assembly 31 is positioned at rest as shown in FIG. 30, and a longer-diameter portion 63b allowing the post 59 to move therein as the elongated member 50 is angularly moved about the support pin 49.

The housing 3 accommodates therein a drive unit (not shown) for driving the disc carrier 19 in response to a command signal from the detector or the disc carrier 19 or a command signal generated when a control button (not shown), for example, is depressed. The drive unit constitutes part of the disc transfer mechanism.

As shown in FIGS. 2 and 4, the power supply 32 includes a drive motor 70 fixed to the chassis 2, a first spur gear 71 fitted over an output shaft 70a of the drive motor 70, a second spur gear 73 rotatably supported by a support pin 42 on the chassis 2 and held in mesh with the first spur gear 71, a worm gear 74 rotatably supported by the support pin 72 and fixed to or integrally formed with the second spur gear 73, and a double gear 76 rotatably supported by a support pin 75 on the chassis 2. The double gear 76 has a smaller gear 77 engageable with the larger gear 53 of the double gear 55 of the link assembly 31 when the disc carrier 19 is accommodated in the housing 3, and a larger gear 78 held in mesh with the worm gear 73. As shown in FIG. 9a, the detector mechanism 35 includes an attachment plate 80 fixedly mounted on the chassis 2, a detector switch 81 secured to the attachment plate 80, a pin member 82 secured to a rear end portion of the tray 23, an engagement member 84 pivotally supported by a support pin 83 on the attachment plate 80 and swingably movable counterclockwise as shown in FIG. 9a by engagement of the pin 82 with an engagement portion 84a (FIG. 9c) immediately before the disc carrier 19 is accommodated in the housing 3, a rocking member 86 pivotally supported by a support pin 85 on the attachment plate 80 and swingably movable counterclockwise about the support pin 85 in response to an abutment portion 86a (FIG. 9d) being pushed by the pin member 82 when the disc carrier 19 is accommodated in the housing 3, an actuator member 87 pivotally mounted by a support pin 83 on the attachment plate 80 and swingably movable to cause a presser 87a (FIG. 9e) to abut against an arm 81a of the detector switch 81, a first biasing device (not illustrated) such as a spring for normally urging the rocking member 86 and the actuator member 87 to turn clockwise in FIG. 9a about the respective support pins 83, 85, and a reset device 88 for releasing the engagement member 84 from engagement with the pin member 82.

The reset device 88 is composed of a solenoid 95 energizable by an operating signal for moving a plunger 95a thereof in the direction of the arrow C (FIG. 9a) and the opposite direction, a connector 97 (FIG. 9f) pivotally supported by a support pin 96 on the attachment plate 80, a second biasing device (not shown) such as a spring for normally urging the connector 97 to turn clockwise (FIG. 9a), and a stop 98 fixed in position to the attachment plate 80 for stopping angular movement of the connector 97 caused by the second biasing means. The connector 97 has a first engagment fork 97a slidably engaging a pin 95b on the plunger 95a of the solenoid 95 and a second engagement fork 97b slidably engaging a stud 84c on a lower surface of the engagement member 84.

The rocking member 86 has an engagement portion 86b engageable with an engagement portion 87b of the actuator member 87 for limiting clockwise angular movement of the actuator member 87 under the force of the first biasing means when the detector mechanism 35 is at rest as shown in FIGS. 9a and 9b. The engagement portions 86b, 87b can be brought out of engagement when the rocking member 86 is engaged and turned by the pin member 82. The rocking member 86 also has a limit portions 86c, 86d which engage the engagement portion 87b of the actuator member 87 and an engagement projection 99 of the attachment plate 80 for limiting clockwise angular movement of the rocking member 86.

The engagement member 84 has an engagement portion 84b engageable with the pin member 82 for locking the disc carrier 19 against forward movement in a direction opposite to the direction of the arrow A (FIG. 2), and an engagement portion 84d engageable with the engagement portion 87b of the actuator member 87 when the engagement member 84 is turned counterclockwise about the support pin 83 in response to actuation of the reset device 88.

When the pin member 82 is brought into engagement with the rocking member 86, the engagement portion 84a of the engagement member 84 is disengaged from the pin member 82 to allow the engagement member 84 to turn clockwise from the angularly moved (actuated) position back to the original rest position under the forces of the first biasing device and the second biasing device through the connector 87 in coaction with the actuator member 87. At this time, the actuator member 87 actuates the detector switch 81.

As shown in FIG. 7, a clamp 101 serving as a disc pressing member supports a ring-shaped magnetic member 102 fitted therein and has a central projection 101a which can be fitted in the recess 9a in the support 9 of the turntable 6. The projection 101a should preferably be made of a magnetic material, and may be separate from the clamp 101.

A clamp support mechanism 105 serves to keep the clamp 101 spaced a distance from the disc carrying surface 25a of the container 25 when the disc carrier 19 projects out of the housing 3, and to move the clamp 101 closely to the turntable 6 when the disc carrier 19 is accommodated in the housing 3.

As illustrated in FIGS. 2 and 7, the clamp support mechanism 105 is composed of a lift cam 107 mounted on a support plate 106 extending laterally on an upper surface of the tray 23 and having opposite ends fixed to the tray 23, a rocking member 109 pivotally mounted by a support pin 108 on the support plate 106, and a coil spring 110 having one end connected to the support plate 106 and an opposite end to the rocking member 109 for normally urging the rocking member 109 to turn counterclockwise as shown in FIG. 2. The lift cam 107 has a front tapered cam surface 107a. The rocking member 109 has in a lower surface thereof a groove 109a (which may be a through hole) in which there is disposed a stud 111 fixed to the support plate 106. The stud 111 in the groove 109a thus limits angular movement of the rocking member 109 about the support pin 108 to a certain angular range.

The rocking member has a clamp support 109b in which the clamp 101 is vertically slidably and rotatably fitted. The clamp support 109b is fitted in a recess 106a in the support plate 106.

The clamp 101 has an engagement portion 101b engageable with the cam surface 107a of the lift cam 107.

To the abutment 38 around the insertion hole 24, there is fixed by an attachment 115 a roller 114 engageable with an engagement surface 109c of the rocking member 109. As shown in FIGS. 1 through 4, 6 and 12, three positioning levers 121, 122, 123 are swingably supported by shafts 121a, 122a, 123a, respectively, on a substantially central portion of the front edge and rear portions of the lateral sides of the tray 23. The positioning levers 121, 122, 123 have engagement pins 121b, 122b, 123b, respectively, projecting upwardly from swingable ends thereof and engageable with an outer peripheral edge of the disc 4. The engagement pins 121b, 122b, 123b can be accommodated in three recesses 23e, respectively, defined in the peripheral edge of the hole 23c in the tray 2. The container 25 has openings 25d, 25e, 25f allowing the positioning levers 121, 122, 123 to swing respectively therein.

Sprockets 124, 125, 126 are rotatably disposed coaxially above the positioning levers 121, 122, 123, respectively, and held in engagement with the corresponding positioning levers 121, 122, 123 for coaction therewith. A chain 127 is trained around the sprockets 124, 125, 126 for actuating them. The chain 127 is also trained around three rollers 128 disposed between the sprockets 124, 125, 126.

Pinions 128, 129 are rotatably disposed coaxially with the positioning levers 122, 123, respectively, and held in frictional engagement with the corresponding positioning levers 122, 123 for coaction therewith. The pinion 128 can mesh with a rack 130 fixed to a front end of one side of the chassis 2, and the pinion 129 can mesh with a rack 131 fixed to a central portion of the opposite side of the chassis 2.

The racks 130, 131 and the pinions 128, 129 jointly constitute a drive force applying mechanism for applying a drive force to the positioning levers 121, 122, 123. The drive force applying mechanism is not limited to the illustrated structure for applying a drive force to the positioning levers 121, 122, 123, but may be an arrangement for imposing a drive force on the sprockets 124, 125, 126 or the chain 127.

The drive force applying device, the sprockets 124, 125, 126, and the chain 127 jointly constitute a synchronous drive means for turning the positioning levers 121, 122, 123 in synchronism. The synchronous drive device and the positioning levers 121, 122, 123 jointly constitute a positioning mechanism for positioning the disc 4 in a prescribed position on the disc transfer mechanism by engagement with the outer peripheral edge of the disc 4.

Although in the illustrated embodiment the pinions 128, 129 and the positioning levers 122, 123 are held in frictional engagement, the present invention is not limited to such a structure, but the drive force applying device may be held in frictional engagement with the sprockets 124, 125, 26 and the chain 127.

The synchronous drive device is not limited to the combination of the sprockets 124, 125, 126 and the chain 127, but may be a combination of pulleys and a belt or a combination of a plurality of smaller-diameter gears and a single larger-diameter gear.

Operation of the automatic loading disc player of the front loading type thus constructed will be described with reference to a normal playback procedure.

When the control button (not shown) is depressed, a command signal is issued to actuate the drive unit to drive the disc carrier 19 in a forward direction until the disc carrier 19 projects out of the housing 3. Then, the disc 4 is fitted in the through hole 23c in the tray 23 and carried on the disc carrying surface 25a of the container 25. At this time, it is desirable that the disc 4 be handled by fingers gripping an edge of the central hole 4a in the disc 4 and an outer perirpheral edge thereof to protect the information recording surface of the disc 4.

The detector device detects when the disc 4 is fitted in the through hole 23c in the tray 23 and carried on the disc carrying surface 25a of the container 25 and issues a command signal, whereupon the disc carrier 19 is driven by the driven unit backward into the housing 3.

As the disc carrier 19 starts moving back, the pinion 128 is brought into mesh with the rack 130 and angularly moved clockwise in FIG. 2 through a certain angle. In response to the angular movement of the pinion 128, the positioning lever 122 held in frictional engagement with the pinion 128 is also angularly moved clockwise to cause the engagement pin 122b to engage the outer peripheral edge of the disc 4. Simultaneously with the angular movement of the positioning levers 122, the other two positioning levers 121, 123 are angularly moved clockwise by the chain 127 to enable the engagement pins 121b, 123b to engage the outer peripheral edge of the disc 4.

The engagement of the three engagement pins 121b, 122b, 123b with the outer peripheral edge of the disc 4 allows the disc 4 to be accurately positioned on the disc carrier 19. As described above, the pinion 128 is turned through a certain angle in mesh with the rack 130. Since the pinion 128 and the positioning lever 122 are frictionally engaged, only the pinion 128 will be slidably turned with respect to the positioning lever 122 after the engagement pins 121b, 122b, 123b of the positioning levers 121, 122, 123 engage the outer peripheral edge of the disc 4 and the positioning levers are stopped against further turning movement.

When the disc carrier 19 begins to be accommodated back into the housing 3, the rocking member 109 of the clamp support mechanism 105 is angularly moved counterclockwise in FIG. 2 about the support pin 108 under the biasing force of the coil spring 110. On the angular movement of the rocking member 109, the clamp 100 is brought out of engagement with the lift cam 107 and moves toward a substantially central portion of the disc 4. When the clamp 100 is moved to a position over the center of the disc 4, the end of the groove 109a in the rocking member 109 abuts against the stud 111 on the support plate 106, thus preventing the rocking member 109 from being angularly moved further.

The clamp 101 is slid downwardly with respect to the clamp support 109b upon angular movement of the rocking member 109, and will have been placed on the disc 4 when the clamp 101 is moved to the position on the center of the disc 4.

As shown in FIG. 9, immediately prior to the disc carrier 19 being accommodated in the housing 3, the pin member 82 on the rear end of the tray 23 engages the engagement portion 84a of the engagement member 84 of the detector mechanism 35 to turn the engagement member 84 from the solid-line position to the two-dot-and-dash-line position in FIG. 9c.

During the continued backward movement of the disc carrier 19, the pin member 82 engages the abutment portion 86a of the rocking member 86 to turn the rocking member 86 from the solid-line position to the two-dot-and-dash-line position in FIG. 9d. In response to the turning movement of the rocking member 86, the engagement portion 86b of the rocking member 86 is disengaged from the engagement portion 87b of the actuator member 87, whereupon the actuator member 87 is turned from the solid-line position to the two-dot-and-dash-line position in FIG. 9e under the biasing force from the first biasing device. Then, the presser 87a of the actuator member 87 pushes the arm 81a of the detector switch 81 to actuate the detector switch 81.

When the pin member 82 and the rocking member 86 are engaged, the engagement portion 84a of the engagement member 84 is disengaged from the pin member 82. The engagement member 84 is now allowed by the first and second biasing devices through the actuator member 87 and the connector 97 to return from the two-dot-and-dash-line position to the solid-line position in FIG. 9c in coaction with the actuator member 87. The pin member 82 is now brought into engagement with the engagement portion 84b of the engagement member 84 to lock the pin member 82 and hence the disc carrier 19.

Just prior to complete accommodation of the disc carrier 19 in the housing 3, the pinion 129 is brought into mesh with the rack 131 and turned counterclockwise in FIG. 2 through a certain angle. As the pinion 129 is thus turned, the positioning lever 123 held in frictional engagement with the pinion 129 is also turned counterclockwise, whereupon the engagement pin 123b on the positioning lever 123 is disengaged from the outer peripheral surface of the disc 4. At the same time that the positioning lever 123 is angularly moved, the other two positioning levers 121, 122 are turned counterclockwise by the chain 127 to cause the engagement pins 121b, 122b to be released from engagement with the outer peripheral edge of the disc 4.

With the disc carrier 19 accommodated in the housing 3, the smaller-diameter gear 77 of the double gear 76 of the power supply 32 is held in mesh with the larger-diameter gear 53 of the double gear 55 of the link assembly 31. Therefore, when the drive motor 70 of the power supply 32 is driven to rotate in a normal direction (which is counterclockwise in FIG. 4) in response to a signal from the detector switch 81, the rocking member 51 of the link assembly 31 is angularly moved counterclockwise in FIG. 2 about the support pin 49 through the first spur gear 71, the second spur gear 73, the worm gear 74, the double gear 76, and the double gear 55.

Then, as shown in FIGS. 10 and 11, the stud 60 projecting from the lower surface of the movable member 61 into the cam hole 65 in the rocking member 51 is pushed by the cam surface 65a to move the movable member 61 in the longitudinal direction of the elongated member 50 (in the downward direction as shown in FIGS. 2 and 10) along the through hole 64 in the member 61 against the biasing force of the coil spring 62. Substantially at the same time that the stud 60 abuts against the rear end (in the direction of the arrow A) of the cam hole 65 after the rocking member 51 has turned through a given angular interval, the stud 59 on the upper surface of the movable member 61 reaches the junction between the shorter-diameter portion 63a and longer-diameter portion 63b of the substantially L-shaped through hole 63. The elongated member 50 is now unlocked and becomes angularly movable about the support pin 49.

On continued angular movement of the rocking member 51, the rear end of the through hole 65 of the rocking member 51 pushes the stud 60 to cause the movable member 61 to turn the elongated member 50 counterclockwise in FIGS. 2 and 10 about the support pin 49. As the elongated member 50 thus initiates its angular movement, the first and second cam members 28, 29 are moved forward and rearward, respectively, to enable the pair of engagement members 44 fixed to the lefthand side of the container 25 to slide along the cam grooves 40, 41 in the first cam member 23 and the grooves 23d in one inner side of the tray 23, and also enable the pair of engagement members 45 fixed to the righthand side of the container 25 to slide along the cam grooves 42, 43 in the second cam member 29 and the grooves 23d in the opposite inner side of the tray 23. Therefore, the container 25 moves downwardly by gravity while carrying the disc 4. The clamp 101 is also slid downwardly with respect to the clamp support 109b with the downward movement of the container 25.

In response to the descent of the container 25, the edge of the central hole 4a in the disc 4 is fitted over the tapered surface 10a of the slider 10 of the turntable 6 so that the disc 4 will be guided to a playback position and positioned on the turntable 6. Approximately at the same time that the disc 4 is placed on the turntable 6, the magnetic member 102 fitted in the clamp 101 is magnetically attracted to the ring-shaped magnet 8 fitted in the support 9 of the turntable 6 to move the disc 4, together with the clamp 101 and the slider 10, downwardly against the biasing force of the coil spring 11 until the disc 4 is held against the disc holder 7. On the downward movement of the disc 4, the disc 4 abuts against the rubber members 14 to cause the cup spring 13 to flex. When the disc 4 is held against the disc holder 7, the rubber members 14 are pressed against the disc 4 by the cup spring 13.

The disc 4 is now clamped on the turntable 6. Since there are sufficient frictional forces acting between the rubber members 14 and the disc 4, the disc 4 is driven without splippage by rotation of the turntable 6. The disc 4 thus rotated can now be played.

After the disc 4 has been played, an operating signal is issued to eject the disc 4 from the housing 3. In response to such an operating signal, the drive motor 70 is driven to rotate in a reverse direction (which is clockwise in FIG. 4). The rocking member 51 of the link assembly 31 is then angularly moved clockwise in FIGS. 2 and 10 to bring the front end (in a direction opposite to the direction of the arrow A) of the through hole 65 in the rocking member 51 into abutment against the stud 60 on the movable member 61. Since the rocking member 51 continues to be angularly moved after the front end of the through hole 65 has been held against the stud 60, the front end of the through hole 65 pushes the stud 60. Therefore, the elongated member 50 starts being turned clockwise in FIGS. 2 and 10 about the support pin 49 by the movable member 61. The first and second cam members 28, 29 are moved rearward and forward, respectively, whereupon the container 25 starts moving upwardly in a process which is the reverse of the process of downward movement of the container 25 as described above.

On upward movement of the container 25, the clamp 101 is caused by the disc 4 to move upwardly with respect to the clamp support 109b. The disc 4 is now unclamped from the clamp 101.

When the stud 59 on the upper surface of the movable member 61 reaches the junction between the shorter-diameter portion 63a and longer-diameter portion 63b of the substantially L-shaped through hole 63 substantially at the same time that the upward movement of the container 25 has been completed, the movable member 61 is biased by the coil spring 62 to move along the through hole 64 in the elongated member 50 in the longitudinal direction thereof (upward direction as shown in FIGS. 2 and 10). The elongated member 50 and hence the link assembly 31 are now locked.

When the elongated member 50 is locked, then the plunger 95a of the solenoid 95 of the detector mechanism 35 is moved in the direction of the arrow C in FIG. 9a. The movement of the plunger 95a causes the connector 97 to turn from the solid-line position to the two-dot-and-dash-line position in FIG. 9f against the biasing force of the first biasing device. Since the stud 84c of the engagement member 84 is in engagement with the second engagement fork 97b of the connector 97, the engagement member 84 is angularly moved from the solid-line position to the two-dot-and-dash-line position (FIG. 9c), and hence is disengaged from the pin member 82. At the same time, the rocking member 86 is also disengaged from the pin member 82, so that the rocking member 86 is returned from the two-dot-and-dash-line position to the solid-line position in FIG. 9d under the biasing force from the second biasing device.

On the angular movement of the engagement member 84, the engagement portion 84d of the rocking member 84 pushes the engagement portion 87b of the actuator member 87 to move the latter from the two-dot-and-dash-line position to the solid-line position in FIG. 9e. Therefore, the detector switch 81 is deactivated.

When the solenoid 95 is de-energized, the connector 97 and the engagement member 84 are angularly moved from the two-dot-and-dash-line position to the solid-line position in FIGS. 9f and 9c under the biasing force of the first biasing device. The detector mechanism 35 is now returned to the original position.

When the disc carrier 19 is disengaged from the engagement member 84, the disc carrier 19 is driven forward by the drive unit to start projecting from the housing 3.

While the disc carrier 19 is in the process of projecting from the housing 3, the engagement surface 109c of the rocking member 109 of the clamp support mechanism 105 engages the roller 114 of the abutment 38 extending around the insertion hole 24 as shown in FIG. 2. The rocking member 109 is then caused to turn clockwise about the support pin 108 under the biasing force from the coil spring 110. The engagement portion 101b of the clamp 101 now engages the cam surface 107a of the lift cam 107, whereupon the clamp 101 is released and moved upwardly with respect to the clamp support 109b of the rocking member 109 while sliding on the cam surface 107a in response to the turning movement of the rocking member 109.

Approximately at the same time that the disc carrier 19 has completely projected out of the housing 3, the upward movement of the clamp 101 is brought to an end, and the clamp support 109b of the rocking member 10 is fitted in the recess 106a in the support plate 106.

With the clamp 101 released, the disc 4 and the slider 10 are returned under the biasing force of the coil spring 11 to the condition prior to being clamped, and the rubber members 14 are also returned to the original releasled condition under the returning force of the cup spring 13.

On the projecting movement of the disc carrier 19 out of the housing 3, the pinion 129 is turned clockwise in FIG. 2 in mesh with the rack 131, thus bringing the engagement pins 121b, 122b, 123b on the positioning levers 121, 122, 123 into engagement with the outer peripheral edge of the disc 4. Immediately before the projecting movement of the disc carrier 19 out of the housing 3 is completed, the pinion 128 is turned counterclockwise in FIG. 2 in mesh with the rack 130. Therefore, the the engagement pins 121b, 122b, 123b on the positioning levers 121, 122, 123 are released from engagement with the outer peripheral edge of the disc 4.

The disc 4 is retrieved from the disc carrier 19 when positioned out of the housing 3, and then the control button is pushed to withdraw the disc carrier 19 back into the housing 3.

While in the illustrated embodiment of the angular movement of the positioning levers 121, 122, 123 is caused by mesing engagement between the pinion 128 and the rack 130 and the pinion 129 and the rack 131, the invention is not limited to such an arrangement, and the positioning levers may be angularly moved in coaction with sliding movement of the cam members 28, 29.

In the foregoing embodiment, all of the three positioning levers are angularly moved out of engagement with the outer peripheral edge of the disc when the disc is to be played back. However, only one of the positioning levers may be angularly movable, and the remaining positioning levers may be replaced with fixed projections. With such a modification, the movable positioning lever may be angularly moved in response to downward movement of the container 25, and the fixed projections may have recesses in their lower ends to provide a gap between the lower ends of the fixed projections and the disc such that the outer peripheral edge of the disc will be disengaged from the fixed projections as the container is lowered.

As described above in detail, the automatic loading disc player of the present invention has a positioning mechanism engageable with at least three points on the outer peripheral edge of a disc for positioning the disc in position on a disc transfer mechanism. Accordingly, the disc can accurately and reliably be positioned on the disc transfer mechanism regardless of the diameter of the disc. In the automatic loading disc player of the invention, the positioning mechanism is driven by the disc transfer mechanism such that the disc will be released from engagement with the positioning mechanism by the disc transfer mechanism. Since the disc transfer mechanism is thus utilized as a drive source for driving the positioning mechanism, no special drive device is necessary for driving the positioning mechanism, and hence the overall cost of the disc player can be reduced. Due to the fact that the positioning mechanism is driven in coaction with the disc transfer mechanism as it transfers a disc, the disc can centrally be positioned while it is being transferred, and can be placed on the turntable in a short period of time.

Although a certain preferred embodiment has been shown and described, it should be understood that many changes and modifications may be made therein without departing from the scope of the appended claims.

We claim:
1. An automatic loading disc player comprising:
 (a) a turntable for rotating a disc to be played;
 (b) a disc transfer mechanism for carrying and transferring said disc into a predetermined playback position on said turntable; and
 (c) positioning means for positioning said disc in a predetermined position on said disc transfer mechanism, said positioning means comprising at least three angularly movable positioning levers having ends engageable with the outer peripheral edge of said disc, and synchronous drive means operatively coupled between said positioning levers for angularly moving said positioning levers in synchronism, thereby being drivable in synchronous coaction with a transferring operation of said disc transfer mechanism, said positioning means being releasable from engagement with said disc while the disc is being played back.

2. The automatic loading disc player according to claim 1, wherein said synchronous drive means comprises rotatable members in engagement with each of said positioning levers, an interlocking member acting on said rotatable members for interlockingly rotating the rotatable members, and drive force applying means for applying a drive force to one of said rotatable members and said interlocking member.

3. The automatic loading disc player according to claim 2, wherein said rotatable members comprise sprockets and said interlocking member comprises a chain trained around said sprockets.

4. The automatic loading disc player according to claim 2, wherein said rotatable members comprise pulleys and said interlocking member comprises a belt trained around said pulleys.

5. The automatic loading disc player according to claim 2, wherein said rotatable members comprise smaller-diameter gears and said interlocking member comprises a single larger-diameter gear meshing with said smaller-diameter gears.

6. The automatic loading disc player according to claim 2, including a housing in which said turntable is disposed, said drive force applying means comprising racks fixed to said housing and pinions for engagement with said positioning levers and angularly movable in coaction with the positioning levers into mesh with said racks.

7. The automatic loading disc player according to claim 2, wherein said rotatable members and said positioning levers are held in frictional engagement with each other.

8. The automatic loading disc player according to claim 2, wherein said drive force applying means is held in frictional engagement with one of said positioning levers, said rotatable members, and said interlocking member.

* * * * *